United States Patent [19]
Weber

[11] Patent Number: 6,055,932
[45] Date of Patent: May 2, 2000

[54] PET FOOD DISPENSER ADAPTER

[75] Inventor: Frank J. Weber, St. Louis, Mo.

[73] Assignee: Ralston Purina Company, St. Louis, Mo.

[21] Appl. No.: 09/021,960

[22] Filed: Feb. 11, 1998

[51] Int. Cl.[7] .................................. A01K 39/00
[52] U.S. Cl. ............................................ 119/52.1
[58] Field of Search ..................... 119/51.01, 52.1, 119/74, 77, 56.1, 53.5, 53, 54

[56] References Cited

U.S. PATENT DOCUMENTS

| | | | |
|---|---|---|---|
| 4,573,434 | 3/1986 | Gardner | 119/77 |
| 4,721,063 | 1/1988 | Atchley | 119/52.1 |
| 4,840,143 | 6/1989 | Simon | 119/52.1 |
| 4,947,796 | 8/1990 | Robinette | 119/51.5 |
| 5,016,572 | 5/1991 | Weber et al. | 119/52.1 |
| 5,259,336 | 11/1993 | Clark | 119/51.5 |
| 5,819,686 | 10/1998 | Credeur | 119/51.5 |

*Primary Examiner*—Thomas Price
*Attorney, Agent, or Firm*—Armstrong Teasdale LLP

[57] ABSTRACT

A pet or animal food dispenser and dispenser adapter for securing pet food containers having a circular discharge openings to pet food dispsenser trays having rectangular food container mounting portions.

46 Claims, 4 Drawing Sheets

PET FOOD DISPENSER ADAPTER

FIELD OF THE INVENTION

This invention relates generally to adapters and more particularly, to adapters for securing pet food containers having circular discharge openings to pet food dispenser trays having rectangular food container mounting portions.

BACKGROUND OF THE INVENTION

Small pets such as dogs or cats require daily feeding. Typically a pet owner will dispense the pet food into a bowl each time the pet is fed. This is a daily chore which can be burdensome. In addition, a pet owner may temporarily be away and unable to dispense the pet food at the desired feeding time. A pet owner who is away for extended periods of time may find it more desirable to use an automatic feeder at home rather than place the pet in a boarding kennel which can be expensive and stressful for the pet.

Pet food dispensers which automatically dispense food and eliminate the daily chore of pet feeding are known. These known dispensers typically include a food container connected to a food tray which dispenses the food to the pet. The container is large enough to hold multiple servings of pet food. The container and the tray facilitate the flow of pet food to the feeding area of the tray without overflow, and the container is securely mounted on the tray so that the pet does not accidentally dislodge the container while eating from the tray.

Although such dispensers are useful, at least some known dispensers require that bulk amounts of pet food be transferred to the food container. Packages of such bulk amounts of food are heavy and make the task of transferring the food difficult and awkward. It is desirable to provide pet food dispensers which employ retail pet food packaging as removable pet food containers so that bulk amounts of food do not have to be transferred.

One known pet food dispenser which employs a retail pet food package as a removable pet food container is described in U.S. Pat. No. 5,016,572, which is assigned to the present assignee. The food package typically is purchased by the consumer at a retail outlet and used with a cooperating dispenser tray. The dispenser tray includes a rectangular container mounting portion with guide tracks or flanges extending along side members which form the mounting portion. The guide tracks or flanges are configured to cooperate with grooves in the container so that the container may be removably mounted on the dispenser tray. This dispenser eliminates the need for bulk transfer of food from a retail package to a dispenser food container, but is limited to use with food packages configured specifically for the particular dispenser tray.

It would be desirable to provide an adapter which can be used to secure commercially available, commonly purchased pet food containers for use with the dispenser tray. It would further be desirable to provide such an adapter which is simple to use and inexpensive to fabricate.

SUMMARY OF THE INVENTION

These and other objects may be attained by a pet food dispenser adapter which adapts many commercially available pet food containers having circular discharge openings for use with the known dispenser tray. In one embodiment, the adapter includes a molded plastic base having an opening, and a flange extending from a periphery of the opening. The flange is configured to be inserted into a circular discharge opening of a commercially available pet food container. The base is substantially rectangular in shape and has grooves along two opposed sides. As explained above, guide members such as tracks or flanges extend along laterally opposed side members of the mounting portion of the dispenser tray and such guide members can be inserted into the grooves on the adapter base. Projections in the grooves on the adapter base are configured to insert into notches in the guide members of the tray mounting portion.

In use, the circular discharge opening of a commercially available pet food container is opened. The adapter flange is inserted into the container circular discharge opening and frictional forces between the adapter flange and rim of the container discharge opening maintain the adpter and container in secure engagement. The combination of the food container and adapter is then connected to the tray by sliding the empty inverted tray onto the adapter. The guide members on the tray insert into the grooves on the adapter base, and the projections in the grooves on the adapter base insert into the notches along the tray guide members to retain the container engaged to the tray. The assembly is then turned upright and food is dispensed from the container into the tray.

The adapter described herein renders many commercially available pet food containers compatible with the dispenser tray and offers a wider choice of pet food containers to consumers. In particular, any pet food container having a discharge opening which can be secured to the adapter may be used with the dispenser tray. In addition, the adapter is simple to use and prevents injury to a feeding pet. The container is securely mounted on the tray to prevent a pet from disengaging the container while eating from the tray, yet the container is easily removed from the tray by the pet owner, and the adapter is easily removed from the container. The adapter is also inexpensive to fabricate and is easily packaged along with pet food.

DETAILED DESCRIPTION

Figure 1:
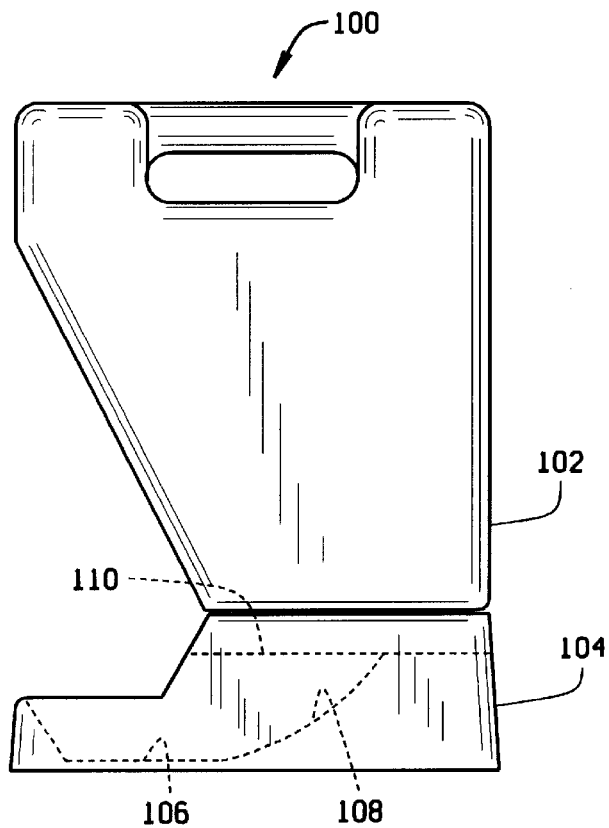
FIG. 1 is a side elevational view of a pet food dispenser including a food container and a dispenser tray.

FIG. 1 is a side elevational view of a pet food dispenser 100 including an exemplary, commercially available food container 102 connected to a dispenser tray 104. Container 102 is full of pet food when purchased and, when used with the present adapter, it is not necessary for the pet owner to transfer bulk amounts of food. In addition, container 102 may be any one of many commercially available pet food containers. Tray 104 includes a forward feeding portion 106 connected by a ramp 108 to a rear container mounting portion 110.

Figure 2:
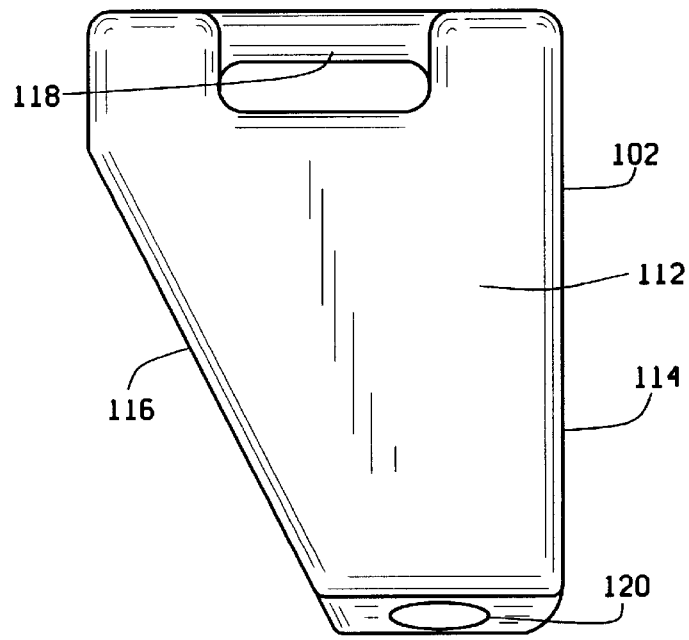
FIG. 2 is a side perspective view of the pet food container shown in FIG. 1.

FIG. 2 is a side perspective view of container 102. Container 102 has spaced side walls 112, a rear wall 114, and a sloping front wall 116. Container 102 also has a handle 118 for ease of carrying, and a base portion having a circular discharge opening 120. Dry, flowable pet food is packaged in container 102 at a pet food production facility. A closure or other seal (not shown) such as a flexible, foil sheet is attached to the periphery of circular discharge opening 120 with a peelable adhesive to seal the pet food in container 102.

Figure 3:
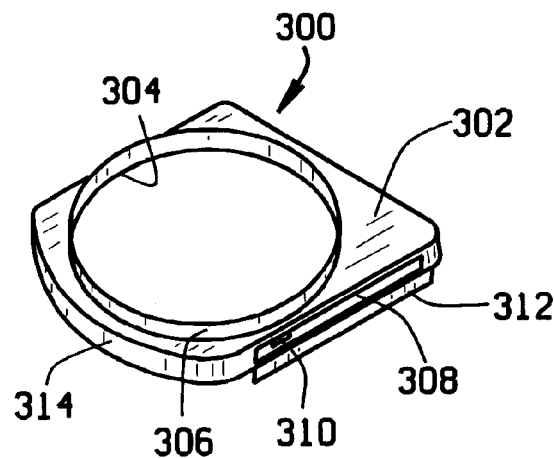
FIG. 3 is a perspective view of a pet food dispenser adapter.

FIG. 3 is a perspective view of a pet food dispenser adapter 300 configured to adapt container 102 for mounting on tray 104. Adapter 300 permits any pet food container having a circular discharge opening of an appropriate diameter to be mounted on tray 104. Adapter 300 includes a base 302 and a circular opening 304 configured to cooperate with discharge opening 120 of container 102. A circular flange 306 extends from base 302 at a periphery of opening 304. Flange 306 is configured to insert into discharge opening 120 of container 102 and hold adapter 300 in place through the action of frictional force between flange 306 and rim of opening 120. Grooves 308 extend along each of two opposed lateral sides of base 302. A projection 310 projects into each groove 308.

Adapter 300 also includes a pair of parallel, stabilizing flanges 312. Each flange 312 extends from opposed, lateral sides of base 302. Stabilizing flanges 312 rest on laterally opposed ledges (described below) of mounting portion 110 and provide vertical support when container 102 is mounted on tray 104 using adapter 300. A forward edge 314 of adapter 300 has a curved surface connecting the two opposed, lateral sides of base 302, to facilitate reducing injury to a pet eating from tray 104. Adapter 300 may be fabricated from plastic using molding processes well known to those skilled in the art, although other suitable materials and processes known to those skilled in the art may be used.

Figure 4:
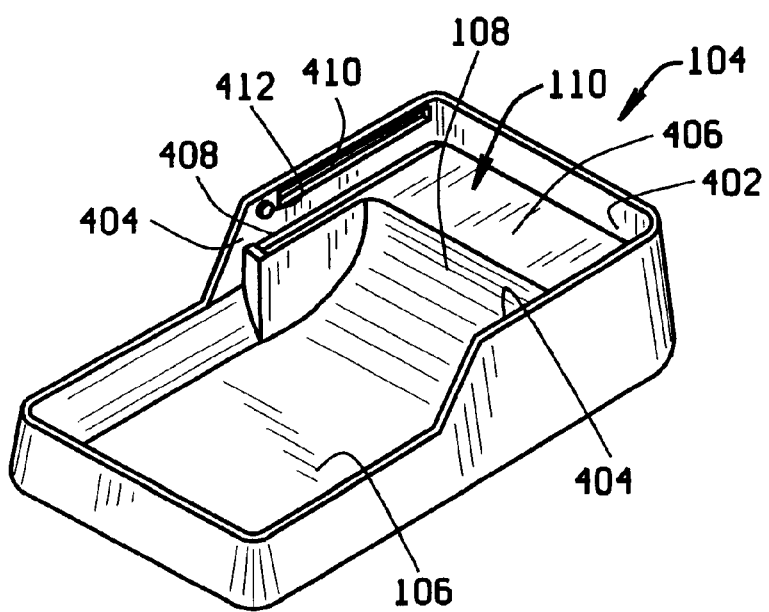
FIG. 4 is a perspective view of the dispenser tray shown in FIG. 1.

FIG. 4 is a perspective view of tray 104 clearly illustrating feeding portion 106, ramp 108 and container mounting portion 110. Mounting portion 110 is substantially rectangular in shape and is defined by a single rear wall 402 and two side walls 404. Mounting portion 110 also includes a generally planar surface 406 connected to ramp 108 and elevated with respect to feeding portion 106. Ledges 408 extend from each side wall 404 and join generally planar surface 406 to side walls 404. Identical, elongated guide members 410 extend along each side wall 404 and are parallel to and spaced above ledges 408. Guide members 410 may be, for example, either tracks or flanges. Guide members 410 each have a notch 412. Projection 310 on adapter 300 is configured to insert into notch 412. Further details regarding tray 104 are set forth in U.S. Pat. No. 5,016,572, which is assigned to the present assignee and incorporated herein, in its entirety, by reference.

Figure 5:
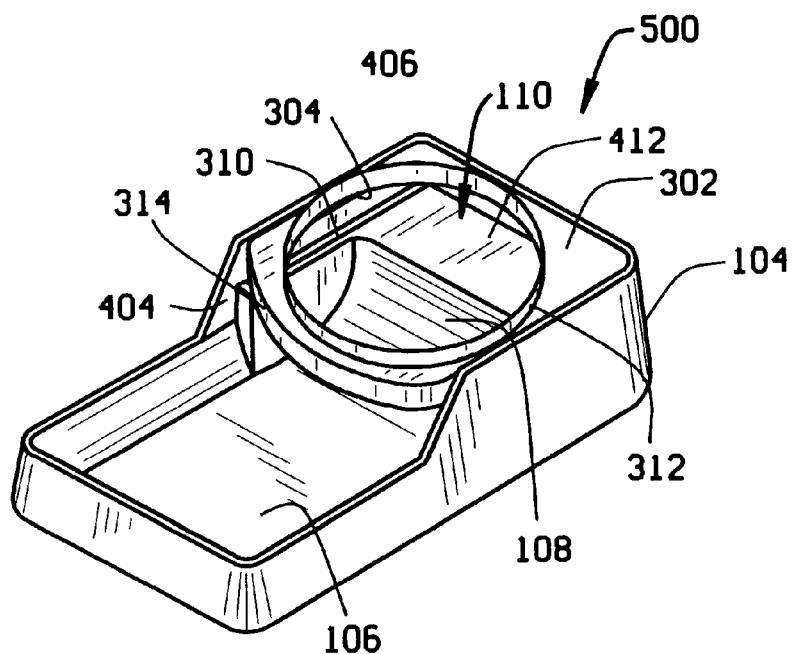
FIG. 5 is a perspective view of the pet food dispenser adapter shown in FIG. 3 in place on the dispenser tray shown in FIG. 4.

FIG. 5 is a perspective view of adapter 300 in place on tray 104. Container 102 is omitted to more clearly illustrate the connection between adapter 300 and tray 104. Adapter base 302 is mounted over planar surface 406 of mounting portion 110. Circular flange 306 extends from base 302 and inserts into container circular opening 120 to securely connect container 102 to adapter 300. Ramp 108 extends downward from surface 406 of mounting portion 110 and from beneath opening 304 to feeding portion 106. Stabilizing flanges 312 rest on respective ledges 408 to provide vertical support when container 102 is connected to adapter 300. Forward edge 314 is oriented toward forward feeding portion 106, resulting in correct orientation of grooves 308 with respect to guide members 410. When adapter 300 is correctly oriented, guide members 410 insert into grooves 308, and projections 310 insert into notches 412 to securely maintain engagement between adapter 300 and tray 104.

Figure 6:
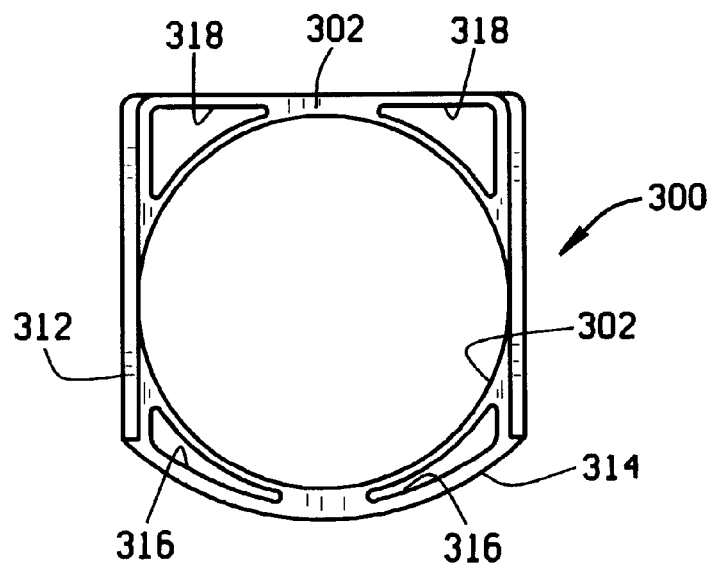
FIG. 6 is a bottom plan view of the pet food dispenser adapter.

FIG. 6 is a bottom plan view of adapter 300 showing circular opening 304 through base 302. In this embodiment, base 302 has recesses 316 and 318. Recesses 316 and 318 reduce the amount of material needed to fabricate, or mold, adapter 300 and also reduce the weight of adapter 300.

Figure 7:
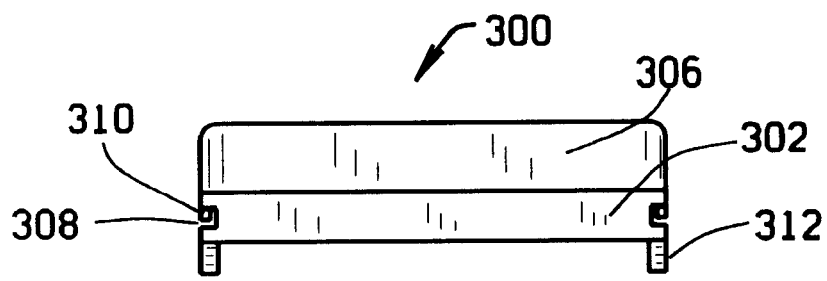
FIG. 7 is a front elevational view of the pet food dispenser adapter.

FIG. 7 is a front elevational view of adapter 300 illustrating circular flange 306 extending from base 302. The height of flange 306 is selected to be sufficient so that a pet food package or container is securely retained in engagement with adapter 300 by frictional force between flange 306 and rim of container discharge opening 120. As shown in FIG. 7, stabilizing flanges 312 extend from opposing sides of base 302, and grooves 308 extend along opposing sides of base 302. Projections 310 are shown projecting from grooves 308.

Figure 8:
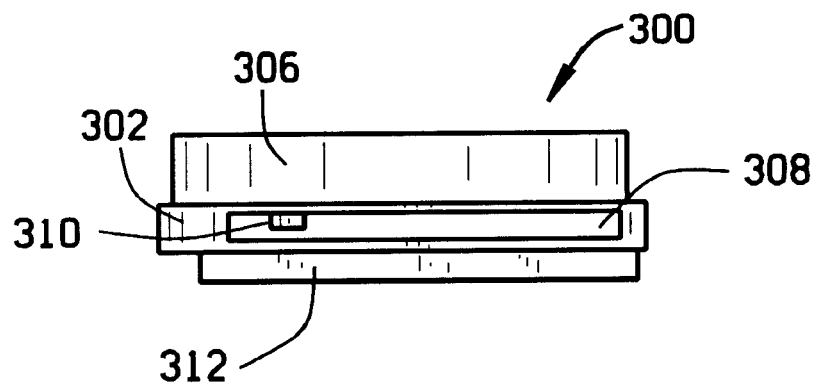
FIG. 8 is a side elevational view of the pet food dispenser adapter.

FIG. 8 is a side elevational view of adapter 300 showing the relative positions of groove 308, projection 310, stabilizing flange 312 and flange 306 on base 302. Projection 310 is generally rectangular, projects into groove 308, and is configured to insert into notches 412 on tray guide members 410. Of course, the shape of projections 310 may vary.

In one embodiment, adapter 300 is 4.75 inches wide, and 5.00 inches long. Opening 304 has a diameter of 4.45 inches and circular flange 306 has an outer diameter of 4.75 inches. Adapter 300 is 1.6 inches thick. Stabilizing flanges 312 are each 0.125 inches thick. Grooves 308 are 0.25 inches wide and 0.125 inches deep. Opening 120 of container 102 (FIG. 2) has a diameter sufficient to allow insertion of circular flange 306 while providing enough friction between flange 306 and rim of opening 120 to securely maintain container 120 and adapter 300 in engagement. Of course, the dimensions of adapter 300 and opening 120 may vary.

In use, opening 120 of container 102 typically is opened by peeling off the flexible foil sheet or other closure used to seal opening 120. Adapter 300 is then engaged to container 102 by inserting circular flange 306 into discharge opening 120. Container 102 and adapter 300 are held together by frictional forces between flange 306 and rim of opening 120. Empty tray 104 is inverted and positioned to slip laterally onto adapter 300 so that guide members 410 are inserted into grooves 308. Since adapter 300 is manufactured from a flexible material such as plastic, projections 310 flex to insert into notches 412 while tray 104 is slipped onto adapter 300. When adapter 300 is in position in tray as in FIG. 5, container 102 in combination with adapter 300 abuts rear wall 402 of tray 104. Tray 104, container 102 and adapter 300 are then turned to an upright position to dispense food.

The insertion of projections 310 into notches 412 functions to secure container 120 over mounting portion 110. Container 120 is not easily dislodged from tray 104 from either the forward or backward direction. Therefore, a pet is not likely to dislodge and be injured by container 120 while feeding from tray 104.

Adapter 300 permits dry, flowable food in container 120 to flow through discharge opening 120 and slide down ramp 108 into feeding portion 106. As the pet consumes the food, feeding portion 106 is filled due to the flow of food from container 102. When container 102 is empty, adapter 300 is easily reused by sliding adapter 300 out from mounting portion 110 toward forward feeding portion 106, and removing adapter 300 from container opening 120. Adapter 300 and tray 104 may then be used with a new container full of food.

Many modifications and variations of the above described apparatus are possible. Container 102 may be, for example, a bottle or jug of different design, or a box, bag, or other package having a circular discharge opening, and the dimensions of container circular discharge opening 120 may vary. Also, the number and relative positions of notches 412 and projections 310 may vary. For example, notches 412 in guide members 410 may be replaced by projections adjacent to guide members which are configured to insert into notches in tray adjacent to grooves 308, and more than a single notch or projection on each side may be used. In another embodiment, tray 104 may have grooves in place of guide members and container 102 may have guide members in place of grooves.

A pet food dispenser adapter as described herein is simple to use and permits the use of a wide array of commercially available pet food containers with the dispenser tray. In particular, any pet food container having a discharge opening which can be secured to the adapter may be used with the dispenser tray. This affords greater flexibility and convenience for the pet owner when purchasing retail pet food. Further, the container is securely mounted on the tray yet easily removed by the pet owner, and the adapter is easily removed from the container. The adapter is also inexpensive to fabricate and is easily packaged along with pet food.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A pet food dispenser adapter for connecting a pet food container having a discharge opening with a circular cross-sectional shape to a tray having a substantially rectangular container mounting portion, the tray having elongate guide members extending along opposed lateral sides of the mounting portion, said adapter comprising:
    a base having an opening therethrough;
    a flange extending from said base at a periphery of said base opening; and
    grooves extending along opposed lateral sides of said base, said grooves configured to receive the tray guide members.

2. A pet food dispenser adapter in accordance with claim 1 wherein said base opening is circular.

3. A pet food dispenser adapter in accordance with claim 1 wherein said flange is circular.

4. A pet food dispenser adapter in accordance with claim 1 wherein said flange is integral with said base.

5. A pet food dispenser adapter in accordance with claim 1 wherein said adapter is plastic.

6. A pet food dispenser adapter in accordance with claim 1 further comprising stabilizing flanges extending from laterally opposed sides of said base.

7. A pet food dispenser adapter in accordance with claim 6 wherein said stabilizing flanges are integral with said base.

8. A pet food dispenser adapter in accordance with claim 1 further comprising retaining means for retaining said adapter on the mounting portion of the tray.

9. A pet food dispenser adapter in accordance with claim 8 wherein said retaining means comprises projections in said grooves.

10. A pet food dispenser adapter in accordance with claim 8 wherein said retaining means comprises notches adjacent to said grooves.

11. A pet food container for use with a pet food dispenser tray having a substantially rectangular container mounting portion, the tray having elongate guide members extending along opposed lateral sides of the mounting portion of the tray, said container comprising:
    a discharge opening with a circular cross-sectional shape; and
    a removable adapter, said adapter comprising:
        a base having an opening therethrough;
        a flange extending from said base at a periphery of said base opening; and
        grooves extending along opposed lateral sides of said base, each of said grooves configured to receive one of the tray guide members.

12. A pet food container in accordance with claim 11 wherein said base opening is circular.

13. A pet food container in accordance with claim 11 wherein said flange is circular.

14. A pet food container in accordance with claim 11 further comprising retaining means on said adapter for retaining said container on the mounting portion of the tray.

15. A pet food container in accordance with claim 14 wherein said retaining means comprises projections in said grooves.

16. A pet food container in accordance with claim 14 wherein said retaining means comprises notches adjacent to said grooves.

17. A pet food container for use with a pet food dispenser tray having a substantially rectangular container mounting portion, the tray having grooves extending along opposed lateral sides of the mounting portion of the tray, said container comprising:
    a discharge opening with a circular cross-sectional shape; and
    a removable adapter, said adapter comprising:
        a base having an opening therethrough;
        a flange extending from said base at a periphery of said base opening; and
        elongate guide members extending along opposed lateral sides of said base, said guide members configured to insert into the tray grooves.

18. A pet food container in accordance with claim 17 further comprising retaining means for retaining said adapter on the mounting portion of the tray.

19. A pet food container in accordance with claim 18 wherein said retaining means comprises projections adjacent to said guide members.

20. A pet food container in accordance with claim 18 wherein said retaining means comprises notches in said guide members.

21. A pet food tray adaptable for use with a pet food container having a discharge opening with a circular cross-sectional shape, said tray comprising:
    a substantially rectangular food container mounting portion, said mounting portion comprising elongate guide members extending along opposed lateral container sides; and
    a removable adapter, said adapter comprising:
        a base having an opening therethrough;
        a flange extending from said base at a periphery of said base opening; and
        grooves extending along opposed lateral sides of said base, each of said grooves configured to receive one of said tray guide members.

22. A pet food tray in accordance with claim 21 wherein said base opening is circular.

23. A pet food tray in accordance with claim 21 wherein said flange is circular.

24. A pet food tray in accordance with claim 21 further comprising retaining means on said adapter for retaining the container on said mounting portion of said tray.

25. A pet food tray in accordance with claim 24 wherein said retaining means comprises projections in said grooves.

26. A pet food tray in accordance with claim 24 wherein said retaining means comprises notches adjacent to said grooves.

27. A pet food tray adaptable for use with a pet food container having a discharge opening with a circular cross-sectional shape, said tray comprising:
    a substantially rectangular food container mounting portion, said mounting portion comprising grooves extending along opposed lateral container sides; and
    a removable adapter, said adapter comprising:

a base having an opening therethrough;
a flange extending from said base at a periphery of said base opening; and
elongate guide members extending along opposed lateral sides of said base, said guide members configured to insert into said tray grooves.

28. A pet food tray in accordance with claim 27 further comprising retaining means for retaining said adapter on the mounting portion of the tray.

29. A pet food tray in accordance with claim 28 wherein said retaining means comprises projections adjacent to said guide members.

30. A pet food tray in accordance with claim 29 wherein said retaining means comprises notches in said guide members.

31. A pet food dispenser comprising:
a pet food container having a discharge opening with a circular cross-sectional shape;
a tray having a substantially rectangular food container mounting portion, said tray comprising elongate guide members extending along opposed lateral sides of said mounting portion; and
a removable adapter, said adapter comprising:
a base having an opening therethrough;
a flange extending from said base at a periphery of said base opening; and
grooves extending along opposed lateral sides of said base, each of said grooves configured to receive one of said tray guide members.

32. A pet food dispenser comprising:
a pet food container having a discharge opening with a circular cross-sectional shape;
a tray having a substantially rectangular food container mounting portion, said tray comprising grooves extending along opposed lateral sides of said mounting portion; and
a removable adapter, said adapter comprising:
a base having an opening therethrough;
a flange extending from said base at a periphery of said base opening; and
elongate guide members extending along opposed lateral sides of said base, said guide members configured to insert into said tray grooves.

33. A pet food dispenser adapter for connecting a pet food container having a discharge opening to a tray comprising a container mounting portion having opposed lateral sides, said adapter comprising:
a base having an opening therethrough; and
a flange extending from said base at a periphery of said base opening.

34. A pet food dispenser adapter in accordance with claim 33 wherein said flange is integral with said base.

35. A pet food dispenser adapter in accordance with claim 33 wherein said adapter is plastic.

36. A pet food dispenser adapter in accordance with claim 33 further comprising stabilizing flanges extending from laterally opposed sides of said base.

37. A pet food dispenser adapter in accordance with claim 33 wherein said stabilizing flanges are integral with said base.

38. A pet food dispenser adapter in accordance with claim 33 further comprising grooves extending along opposed lateral sides of said base.

39. A pet food dispenser adapter in accordance with claim 33 further comprising elongate guide members extending along opposed lateral sides of said base.

40. A pet food dispenser adapter in accordance with claim 33 further comprising retaining means for retaining said adapter on the mounting portion of the tray.

41. A pet food dispenser adapter in accordance with claim 40 wherein said retaining means comprises projections.

42. A pet food dispenser adapter in accordance with claim 40 wherein said retaining means comprises notches.

43. A method for adapting a pet food container having a circular discharge opening to a pet food tray having a substantially rectangular container mounting portion, the mounting portion having elongate guide members extending from opposed lateral sides, said method comprising the steps of:
providing an adapter comprising a base with an opening therethrough, a flange extending from the base at a periphery of the base opening, wherein the flange is configured to insert into the discharge opening, the flange held in place by frictional forces, and grooves extending along opposed lateral sides of the base, wherein the adapter grooves are configured to receive the tray guide members;
opening the circular discharge opening of the pet food container;
inserting the adapter flange into the circular discharge opening;
inverting the tray; and
sliding the inverted tray onto the adapter so that the tray guide members insert into the adapter grooves.

44. The method in accordance with claim 43, further comprising the step of returning the tray to an upright position.

45. A method for adapting a pet food container having a circular discharge opening to a pet food tray having a substantially rectangular container mounting portion, the mounting portion having grooves extending along opposed lateral sides, said method comprising the steps of:
providing an adapter comprising a base with an opening therethrough, a flange extending from the base at a periphery of the base opening, wherein the flange is configured to insert into the discharge opening, the flange held in place by frictional forces, and elongate guide members extending along opposed lateral sides of the base, wherein the adapter guide members are configured to insert into the tray grooves;
opening the circular discharge opening of the pet food container;
inserting the adapter flange into the circular discharge opening;
inverting the tray; and
sliding the inverted tray onto the adapter so that the adapter guide members insert into the tray grooves.

46. The method in accordance with claim 45, further comprising the step of returning the tray to an upright position.

* * * * *